(12) United States Patent
Lueker et al.

(10) Patent No.: US 6,647,444 B2
(45) Date of Patent: Nov. 11, 2003

(54) DATA SYNCHRONIZATION INTERFACE

(75) Inventors: Jonathan C. Lueker, Portland, OR (US); Dean Warren, Carlton, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 09/750,091

(22) Filed: Dec. 29, 2000

(65) Prior Publication Data

US 2002/0087755 A1 Jul. 4, 2002

(51) Int. Cl.[7] .......................... G06F 13/14; G06F 13/20
(52) U.S. Cl. ..................... 710/61; 710/52; 710/53; 710/58; 710/60
(58) Field of Search .................... 710/52, 53, 58, 710/60, 61

(56) References Cited

U.S. PATENT DOCUMENTS

| | | | |
|---|---|---|---|
| 4,314,355 A | * 2/1982 | Leighou et al. | 710/61 |
| 4,463,443 A | * 7/1984 | Frankel et al. | 710/60 |
| 4,653,019 A | * 3/1987 | Hodge et al. | 708/209 |
| 4,965,794 A | * 10/1990 | Smith | 370/506 |
| 5,410,677 A | * 4/1995 | Roskowski et al. | 710/65 |
| 5,557,271 A | * 9/1996 | Rim et al. | 341/67 |
| 5,790,891 A | * 8/1998 | Solt et al. | 710/34 |
| 6,078,976 A | * 6/2000 | Obayashi | 710/315 |
| 6,131,138 A | * 10/2000 | Packer et al. | 711/4 |
| 6,512,804 B1 | * 1/2003 | Johnson et al. | 375/372 |

* cited by examiner

Primary Examiner—Rehana Perveen
(74) Attorney, Agent, or Firm—Kenyon & Kenyon

(57) ABSTRACT

Incoming serial data which is received M bits at a time where M=N, N+1 or N−1 and N is greater than 1 is synchronized to a local clock by receiving a first M bits of data, storing the first M bits, receiving M additional bits, storing the M additional bits, repetitively receiving and storing until at least a predetermined number R of bits have been stored, where $R=(M*X)+1$ where X is an integer greater than one. When this occurs, the first R bits are output and any remaining S bits in excess of R are stored and additional groups of M bits added, with the process continuing until all of a packet has been received. With this arrangement, the R bits may be output at a rate which is a fraction of the serial bit rate.

23 Claims, 4 Drawing Sheets

DATA SYNCHRONIZATION INTERFACE

FIELD OF THE INVENTION

Embodiments of the present invention relate to synchronizing serial data which has been transmitted at one rate and recovered at a different rate.

BACKGROUND OF THE INVENTION

In some data communication arrangements, data are transmitted from one domain at a first rate and received in another domain at a second rate. When the data is recovered, it is normally done N bits at a time. However, the timing differences may sometime cause N+1 or N−1 bits to be recovered. This variation requires some mechanism to establish synchronization at the receiver. In other words, this data coming in at a variable rate must be output at a predictable consistent rate. In the past the necessary elasticity has been provided by using first-in, first-out (FIFO) buffer of sufficient size accommodate variations over the time of a transmitted packet. That is the size is dependent on the maximum number of possible bits of mismatch over the time of a packet. In this arrangement, data was written into the buffer at the transmit rate. When the buffer was half full, read out began at the receive clock rate.

This is a general problem in data transmission where clock rates may vary between the transmitter and receiver. One example, but by no means the only one, is the Universal Serial Bus (USB). The USB is a bus having electrical, mechanical, and communication characteristics that follows a protocol defined in "Universal Serial Bus Specification" Revision 2.0 published Apr. 27, 2000, by Compaq Computer Corporation, Hewlett-Packard Company, Intel Corporation, Lucent Technologies Inc, Microsoft Corporation, NEC Corporation and Koninklijke Phillips Electronics N.V. The USB Specification provides a standardized approach for component interconnection and data transfer.

From the digital communications perspective, a USB transmitting device sends data in the form of packets over a USB cable to a USB receiving device with the clock signal of the transmitting device being used when encoding digital information. Packets include a defined sync field having multiple bits with a transition for each bit (i.e., from a logic 1 to a logic 0 or vis-versa), a payload with data information, and an end of packet field. The USB Specification does not allow for a separate clock signal to be transmitted and this requires some form of data synchronization.

A similar problem exists when bit stuffing takes place during transmission. For example in a USB transmitter bit stuffing may take place. In that case the bit stuffing defined by the USB specification causes extra bits to be inserted in the transmitted stream. Thus, provision must be made for synchronization between the data source and the transmit circuitry in the presence of these extra bits.

The FIFO elasticity buffer has some problems. It introduces data latency while the buffer is pre-filling and, in the case of the transmitter being faster than the receiver, the buffer is full by the end of the maximum length packet and must be drained before reception of the next packet can begin. Furthermore, a FIFO which operates at the data rates currently needed, e.g., 480 Mb/s is not easy to implement in readily available CMOS ASIC library elements A need, therefore, exists for a technique of transferring signals between multiple clock timing domains that reduces or addresses these problems.

DETAILED DESCRIPTION

Embodiments of methods and systems for synchronizing data are described. In the following description, for purposes of explanation, numerous specific details are set forth to provide a thorough understanding of the present invention. It will be appreciated, however, by one skilled in the art, that the present invention may be practiced without these specific details. In other instances, structures and devices are shown in block diagram form. Furthermore, one skilled in the art can readily appreciate that the specific sequence in which methods are presented and performed are illustrative and it is contemplated that the sequences can be varied and still remain within the spirit and scope of the present invention.

Figure 1:
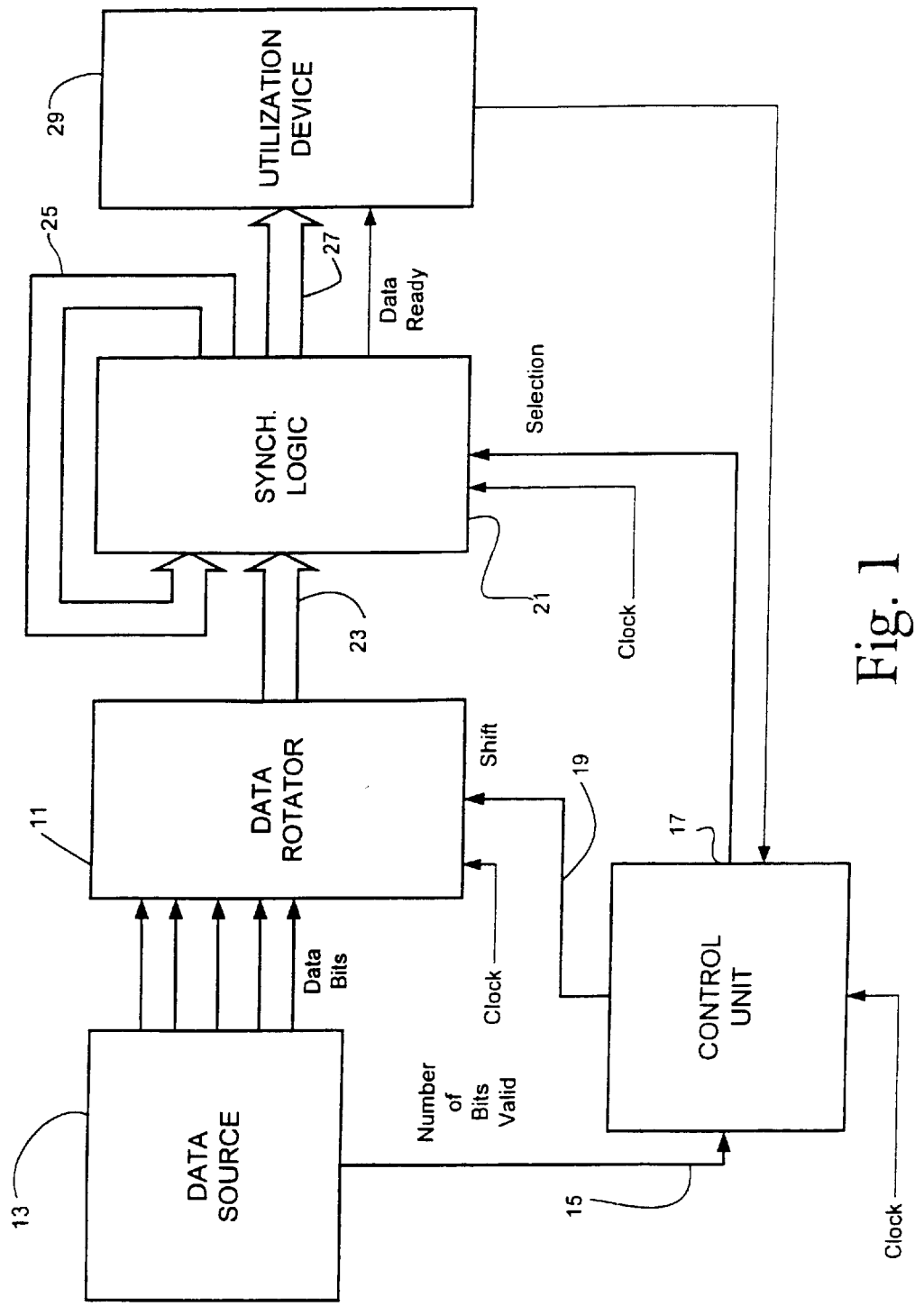
FIG. 1 is a block diagram of a data synchronizer in accordance with an embodiment of the present invention.

FIG. 1 is a block diagram of a data synchronizer in accordance with an embodiment of the present invention. In accordance with the embodiment illustrated in FIG. 1, a data rotator 11 receives data bits from a data source 13. This may be a data recovery block recovering serial data which has been received. However, it could also be a data source for a transmitter in which bit stuffing takes place. In this embodiment, the data source 13 typically outputs 4 valid bits. In an embodiment where serial data is being received, this is output at a rate which is one-fourth the bit rate. Thus, if the bit rate is 480 Mb/sec., (as in USB 2.0) data will be clocked out of data source groups at 120 Mgroups/sec. Although in this example, 4 bits is the norm, the present invention is not so limited. As noted above, in the case of received data, because of the difference in the clock rate of a transmitter from which the data was originally received and the clock rate of the receiver in which the data source block 13 is located, there will be times when only three valid bits (N−1) are provided from the data source block 13 to data rotator 11. At other times, and extra bit (N+1) for a total of 5 bits will be provided. Where used in a transmitter, extra bits are periodically inserted to result in (N+1) bit outputs. For the remainder of the discussion, a situation where data is received will be assumed. However, the arrangement is equally capable of synchronizing data going from a data source to a transmitter, i.e., in a case where the utilization device is a data transmitter.

Data source block 13 indicates on line 15 the number of valid bits. This is input to a control unit 17 which provides an output on line 19 to data rotator 11 to implement a barrel shift of from 0 to 4, places, as will be explained below. Data rotator 11 in one embodiment may be a barrel shifter. Control unit 17 may be a state machine. However, it could also be implemented with a programmed processor. The output of data rotator 11 is provided as an input to synchronizing logic 21 which, as described in more detailed below, includes, in the illustrated embodiment, a 15 bit register with multiplexers at its input. In this embodiment, the data rotator provides, on bus 23, 15 output bits. In addition, the outputs of the register in synchronizing logic 21 are fed back to the multiplexers at the input over bus 25. Data is clocked into the register in synchronizing logic 21 at one-fourth the data rate.

Data is clocked out of the synchronizing logic 21 at ⅛ the bit rate. It outputs nine bit words on a bus 27 to a utilization device 29. On each register clock for the synchronizing logic 21, the decoding and multiplexing logic allows performing one of the following functions:

1. Write/hold—a write pointer points to the first bit to be written; below this pointer the bits are "held;"
2. Write/shift—a write pointer points to the first bid to be written, and below the pointer each bit (N) takes on the kind value of the location (N+9).

Figure 2:
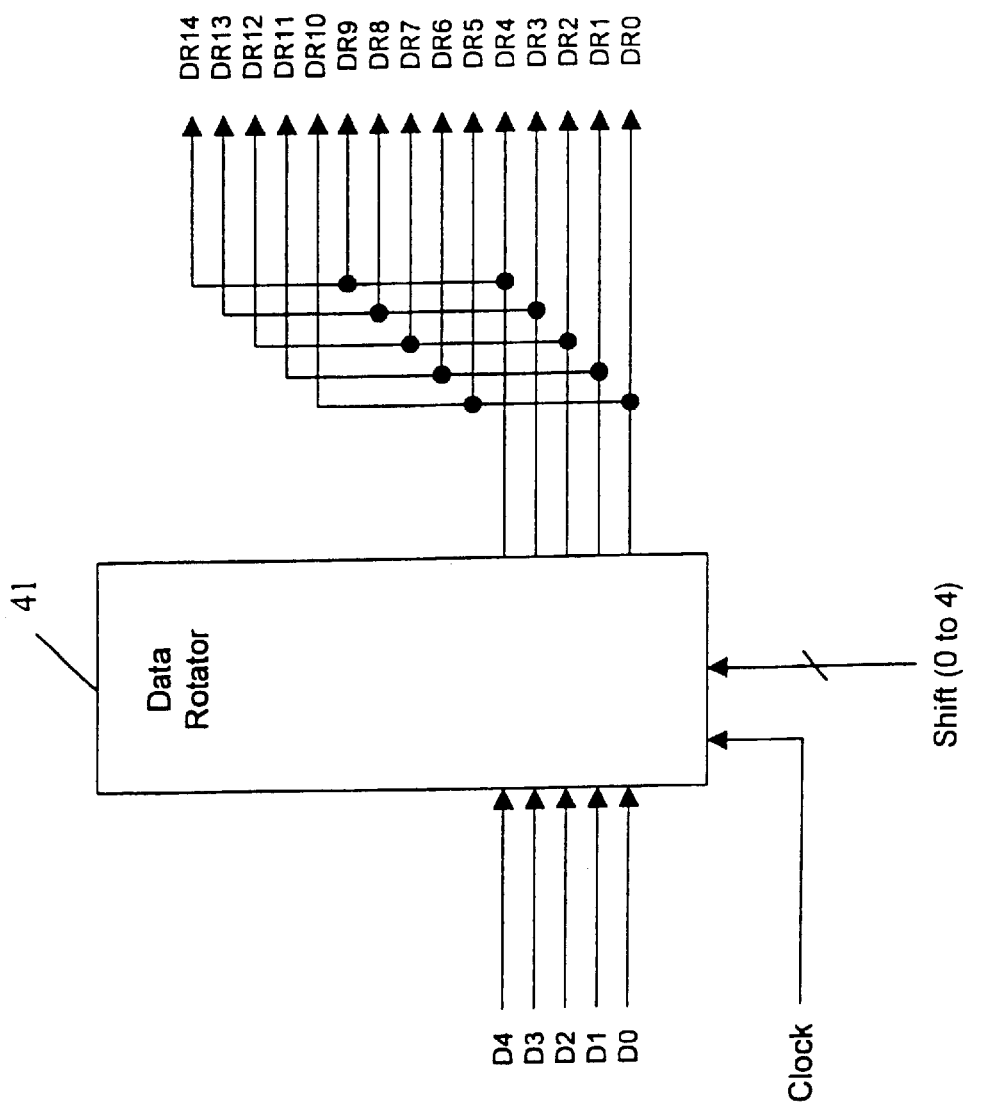
FIG. 2 is a block diagram of an embodiment of a data rotator which can be used in the embodiment of FIG. 1.
Figure 3:
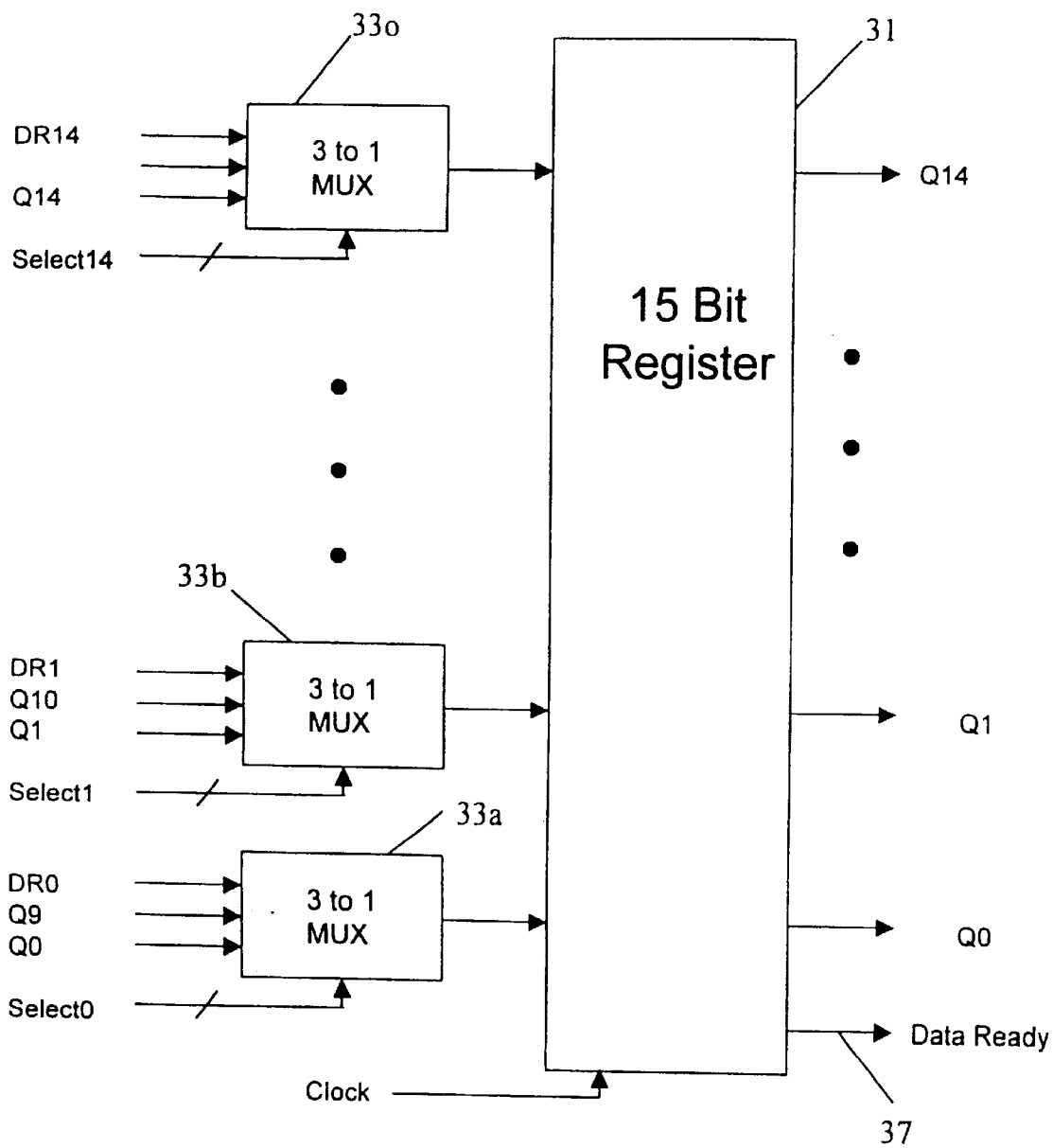
FIG. 3 is a block diagram of an embodiment of multiplexer and register logic outputting synchronized data which can be used in the embodiment of FIG. 1.
Figure 4:
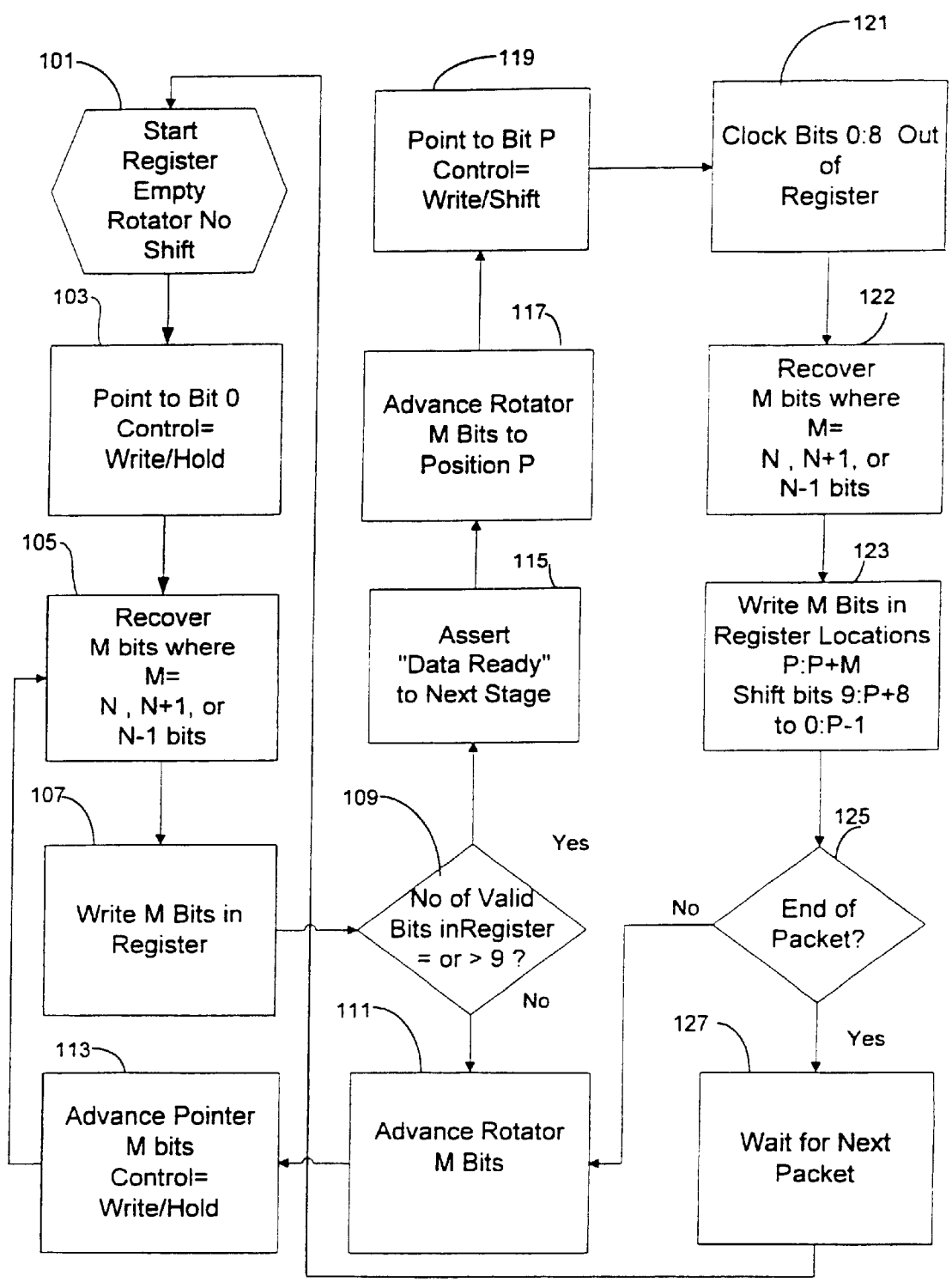
FIG. 4 is an exemplary flow diagram for an embodiment of the present invention such as that of FIGS. 1–3

FIG. 2 is a block diagram of an embodiment of a data rotator and FIG. 3 is a block diagram of an embodiment of multiplexer and register logic outputting synchronized data which can be used in the embodiment of FIG. 1. FIG. 4 is a flow diagram of an embodiment of a process which can be carried out, for example, utilizing the embodiments of FIGS. 1, 2 and 3. The control for executing these steps may be implemented using the control unit 17 of FIG. 1. Alternatively, instead of employing the hardware shown in these figures, the steps of FIG. 14 can be implemented in a programmed processor and its associated memory. In such a case, a computer readable memory containing program instructions that, when executed by a processor, cause the processor to execute steps, such as those of the embodiment of FIG. 4, will be provided Initially, the register 31 of FIG. 3 is reset. That is, it is empty. The rotator 41 of FIG. 2 is set for no shift. This is indicated by block 101 of FIG. 4. The write pointer in control unit 17 points to bit zero and the control mode in the control unit 17 is write/hold as indicated in block 103. Data source block 13 recovers the first M bits as indicated in block 105. As noted above, this can be N, N+1 or N−1 bits. Normally, the first group of bits will be N bits, in this example 4, since it takes some time for a time difference to build up. In the write/hold mode, all the points above the bit pointed to will be written. Thus, assuming that 4 valid bits are input, these bits will be provided to inputs D0–D3 of data rotator 41, and since there is no rotation will also appear at outputs DR0–DR3, DR5–DR9, and DR10–DR13. Of course, some output will also be provided on D4 and will appear on DR4, DR9 and DR14.

The outputs DR0–DR14 of the data rotator of FIG. 2 are inputs to a series of 3 to 1 multiplexers 33a–33o, of which only multiplexers 33a, 33b and 33o are shown in FIG. 3. It will be recognized that 12 additional multiplexers are provided between multiplexers 33b and 33o. Multiplexer 33a has as additional inputs the Q0 and Q9 outputs of register 31. Multiplexer 33b has as additional inputs the Q1 and Q10 outputs and so forth. As noted, bit zero is selected and on the next clock cycle, what is at the 15 outputs of FIG. 2 will be coupled into 15 inputs of register 31. This occurs because the first input of each of the multiplexers 33 is selected. In turn, this will cause the recovered M bits to be written into the register as indicated by block 107 of FIG. 4. Data above bit 3 will be invalid. However, by the time data is output from register 31, this invalid data will have been overwritten as will become apparent from the discussion below.

There are now 4 valid data bits in bit positions 0–3 of register 31. The next step in FIG. 4 is a decision block to check on whether the number of valid bits in register 31 is equal to or greater than a predetermined value equal to R, where R=(X*N)+1, in this case 9, where N=4 and X=2. This is indicated by block 109. In this case, since there are only 4 bits, the answer is no, and block 111 is entered. The shift input of data rotator 11 is rotated M bits so that the first bit D0 will be input to the M+0 bit position of the data rotator 11. Thus in the example given, where M−4, bit 4 will receive input D0. This means that D1 will go to bit position 0, D2 to bit position 1 and so on. If there were only 3 valid bits for the previous input, i.e., M=3, D0 would be input to bit 3. Similarly if there were five valid bits, input D0 would be provided to bit 0 again. Note that the input D1 will appear not only at output DR0, but also at output DR5, D2 at DR1 and DR6 and so on.

Since, in the present example, the first 4 bits in register 31 are valid, the write pointer is advanced M=4 bits to bit 4, a shown in block 113 of FIG. 4. The control mode remains in write/hold, as indicated. What this means is that on the next clock cycle, outputs DR4–DR14 (the first inputs) of the data rotator will be selected at their respective multiplexers 33, but, for multiplexers 33a–33d, for the first four bits, the second inputs Q0–Q3 will be selected thereby holding the values previously loaded into those bits of register 31. The steps of blocks 105, 107 and 109 are again performed. If we again assume that 4 valid bits were received in the second group of bits, there are now eight valid bits in register 31. The number of valid bits has still not reached nine so that block 111 must be entered again.

Data rotator 41 must again rotate by M=4 bits. This means that input D0 is now input to bit 3 of data rotator 41. As a result, it appears at outputs DR3, DR8, and DR13. Thus, the five inputs D0–D4 now appear at DR8–DR13. Once again, the steps of blocks 113, 105, and 107 are executed. The write pointer is advanced to designate bit eight of register 31. The control is again set to write/hold. Thus, the bits in register 31 below bit eight, i.e., bits 0–7 are held. The outputs DR8–DR13, are now clocked into bits 8–13 of register 31. If, for example, at this point only three valid bits were presented to data rotator 11, there will be eleven valid bits in register 31.

Because there are at least nine valid bits in register 31, the answer from block 109 is yes and the register asserts the data ready signal on line 37 as indicated in block 115. As shown by block 117, the rotator is again advanced M bits to a position designated as P. In this case, since on the previous cycle only three bits were valid, M=3. This means that the rotator, once rotated by three bits, will accept the first bit D0 add its bit 2 location. That is, P=2. As indicated by block 119, the write pointer is set to location P, that is, in this example to bit 2. Now, on the next clock cycle, bits 0:8 are clocked out of register 31 on the bus 27 of FIG. 1 into utilization device 29 as indicated by block 121. M bits are recovered as indicated by block 122. These are written then in register locations P:P+(M−1). Because the control was set to write/shift, as indicated by block 123, the remaining S bits, bits 9:(P+8) are shifted to register locations O:(P−1), under control of multiplexers 33, which for these first S bits have the third input of their respective multiplexers selected. In the present example, bits 9 and 10 are shifted down to locations 0 and 1.

As indicated in FIG. 4, a check is made in block 125 to see if the end of the packet has been reached. Detection of the end of the packet may be done in utilization device 29 and supplied back to control unit 17. If the packet has not ended, the steps beginning with block 111 are performed. When the end of the packet is reached, as indicated by block 127, this system waits for the next packet and then restarts in block 101.

Embodiments of methods and apparatus for data synchronization have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. In particular, although the rotating, multiplexing and storing are shown as being implemented in hardware, these functions could also be implemented in a processor and its associated memory. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method for synchronizing data comprising:
   a. receiving data M bits at a time, where M varies between N, N+1 and N−1 and N is greater than 1; and
   b. outputting data R bits at a time where R=(M*X)+1 where X is an integer greater than one.

2. The method for synchronizing data according to claim 1 comprising:
   a. receiving a first M bits of said data;
   b. storing said first M bits;
   c. receiving M additional bits;
   d. storing said M additional bits;
   e. repeating c. and d. until at least R bits have been stored;
   f. outputting R bits;
   g. continuing to store any remaining S bits in excess of R; and
   h. continually repeating c.–g.

3. A method for synchronizing data according to claim 2 wherein said data are obtained from serial data transmitted at a first clock rate, said receiving of M bits of a. and c. being at a second clock rate which is 1/N of said first clock rate and outputting said R bits of f. at a third clock rate which is 1/(R−1) of said first clock rate.

4. A method for synchronizing data according to claim 3 wherein N=4 and R=9.

5. A method for synchronizing data according to claim 4 wherein said serial data is USB 2.0 data and said first clock rate is 480 Mb/sec.

6. A method for synchronizing data according to claim 2 wherein said data is transmitted in packets and c.–g. are performed until the end of the packet.

7. A method for synchronizing data according to claim 3 wherein said storing said first M bits comprises storing said bits in the first M locations of a register, said storing said additional M bits comprises storing said additional M bits in the next M locations and so on and where said continuing to store any remaining bits comprises storing said remaining S bits in the first S locations of said register and thereafter storing additional M bits in the next M locations and so on until f. is again performed.

8. A method for synchronizing data according to claim 7 wherein a. and c. comprise receiving at a rotator and coupling the output of said rotator to inputs of said register, said rotator set for zero shift when receiving said first M bits and thereafter, being shifted M bits, each time M bits are received.

9. A method for synchronizing data according to claim 8 wherein said storing comprises pointing to bit zero in said register as the first bit to be stored when storing said first M bits and thereafter advancing said pointer M bits for each M bits stored, said pointer being moved to bit position S+1 when said remaining bits are stored in the first S locations of said register.

10. A method for synchronizing data according to claim 2 and further including asserting a data valid signal to a next stage when R valid data bits are detected.

11. Apparatus for synchronizing data comprising:
   a. a data rotator having N+1 data inputs coupled to receive M bits of said data where M varies between N, N+1 and N−1 and N is greater than 1 and having 3*(N+1) outputs;
   b. a register having 3*(N+1) bit locations, 3*(N+1) inputs and 3*(N+1) outputs;
   c. a plurality of 3*(N+1) multiplexers each having 3 inputs and an output, the respective 3*(N+1) outputs of said multiplexers coupled to the respective 3*(N+1) inputs of said register, the respective the first (N+1) outputs of said register coupled to respective second inputs of the first (N+1) of said multiplexers, the second (N+1) outputs of said register coupled to respective third inputs of said first (N+1) of said multiplexers;
   d. R output lines, from the first R of said 3*(N+1) outputs of said register providing a final output of said apparatus where R=(M*X)+1 where X is an integer greater than one; and
   e. a control unit providing control inputs to said rotator, said register and said multiplexers.

12. Apparatus for synchronizing data according to claim 11 wherein said control unit comprises a state machine.

13. Apparatus for synchronizing data according to claim 11 wherein said control unit comprises a programmed processor.

14. Apparatus for synchronizing data according to claim 11 wherein said data are obtained from serial data transmitted at a first clock rate, said data rotator receives data at a second clock rate which is 1/N of said first clock rate and said register output said R bits at a third clock rate which is 1/(R−1) of said first clock rate.

15. Apparatus for synchronizing data according to claim 14 wherein N=4 and R9.

16. Apparatus for synchronizing data according to claim 15 wherein said serial data is USB 2.0 data and said first rate is 480 Mb/sec.

17. Apparatus for synchronizing data according to claim 11 wherein said control unit is arranged to:
   a. reset said register and set said rotator for no shift prior to receiving a first M bits of said data;
   b. set a pointer to the 0 bit of the register and a control signal to a write/hold state where bits above said pointer are written by selecting the first inputs of their respective multiplexers and bits below said pointer are held at their present value by selecting the second inputs of their respective multiplexers;
   c. shift the rotator M bits and move the pointer M bits after each storage of M bits;
   d. upon detecting at least a predetermined number R of valid bits having been stored, where R(M*X)+1 where X is an integer greater than one, setting a pointer to bit S+1 and the control signal to a write/shift state to select the third inputs of the respective multiplexers so that bits below said pointer take on the values of the S bits above said number R; and
   e. causing c.–d to repeat until no more data is received.

18. Apparatus according to claim ii wherein said rotator is a barrel shifter.

19. A computer readable memory containing program instructions that, when executed by a processor, cause the processor to:
  a. receive a first M bits of said data where M varies between N, N+1 and N−1 and N is greater than 1;
  b. store said first M bits;
  c. receive M additional bits;
  d. store said M additional bits;
  e. repeat c. and d. until at least a predetermined number R of bits have been stored, where R=(M*X)+1 where X is an integer greater than one;
  f. output the first R bits;
  g. continue to store any remaining S bits in excess of R; and
  h. continually repeat c.–g.

20. A computer readable memory according to claim 19 wherein said data are obtained from serial data transmitted at a first clock rate, said M bits of a. and c. being received at a second clock rate which is i/N of said first clock rate and said R bits of f. being output at a third clock rate which is 1/(R−1) of said first clock rate.

21. A computer readable memory according to claim 20 wherein said data is transmitted in packets and the processor is caused to perform c.–g. until the end of the packet.

22. A computer readable memory according to claim 20 wherein said processor is caused to store said first M bits in the first M locations of a register, to store said additional M bits in the next M locations and so on and is caused store any remaining S bits in the first S locations of said register and thereafter to store additional M bits in the next M locations and so on until f. is again caused to be performed.

23. A computer readable memory according to claim 19 and further including causing said processor to assert a data valid signal to a next stage when R valid data bits are detected.

* * * * *

UNITED STATES PATENT AND TRADEMARK OFFICE
CERTIFICATE OF CORRECTION

PATENT NO. : 6,647,444 B2
DATED : November 11, 2003
INVENTOR(S) : Jonathan C. Lueker et al.

It is certified that error appears in the above-identified patent and that said Letters Patent is hereby corrected as shown below:

Column 8,
Line 1, "i/N" should be -- 1/N --

Signed and Sealed this

Seventeenth Day of August, 2004

JON W. DUDAS
*Acting Director of the United States Patent and Trademark Office*